United States Patent [19]

Bolger et al.

[11] Patent Number: 4,558,348

[45] Date of Patent: Dec. 10, 1985

[54] DIGITAL VIDEO SIGNAL PROCESSING SYSTEM USING ASYNCHRONOUS A-TO-D ENCODING

[75] Inventors: Thomas V. Bolger, Merchantville; Robert L. Libbey, Cherry Hill, both of N.J.

[73] Assignee: RCA Corporation, Princeton, N.J.

[21] Appl. No.: 567,190

[22] Filed: Dec. 30, 1983

[51] Int. Cl.[4] ............................................. H04N 9/50
[52] U.S. Cl. .................................... 358/13; 358/21 R; 358/320
[58] Field of Search ........................ 358/11, 12, 13, 15, 358/16, 30, 21 R, 23, 36, 37, 28, 29, 39, 40, 320; 375/25, 26, 111, 118

[56] References Cited

U.S. PATENT DOCUMENTS

| | | | |
|---|---|---|---|
| 4,219,838 | 8/1980 | Rossi | 358/21 R |
| 4,270,139 | 5/1981 | Flamm et al. | 358/23 |
| 4,352,123 | 9/1982 | Flamm | 358/21 R |
| 4,404,583 | 9/1983 | Tatami | 358/19 |
| 4,412,181 | 10/1983 | Marguinaud et al. | 329/50 |
| 4,475,220 | 10/1984 | Mattei | 375/86 |
| 4,514,754 | 4/1985 | Nillesen | 358/19 |
| 4,523,221 | 6/1985 | Chin | 358/21 R |

FOREIGN PATENT DOCUMENTS 0071506  2/1983  European Pat. Off. .
2507847 12/1982  France .

OTHER PUBLICATIONS

SMPTE, "Digital Video", vol. 3, pp. 89–98, Jun. 1980.

*Primary Examiner*—Michael A. Masinick
*Attorney, Agent, or Firm*—Eugene M. Whitacre; Paul J. Rasmussen; Eric P. Herrmann

[57] ABSTRACT

A digital TV receiver having an analog-to-digital converter which generates digital representations of the analog signal asynchronously relative to the color burst reference, includes open loop circuitry for correcting the values of the chrominance component to comport with chrominance samples having a fixed phase relationship with burst. During the burst interval the angle of the chrominance phasor relative to the asynchronous sampling instants is compared with a fixed angular reference value to generate a correction factor for the respective line of video signal. The correction factor is thereafter combined with the chrominance samples to generate new chrominance samples having a desired phase relationship with the phase of the burst reference signal.

10 Claims, 8 Drawing Figures

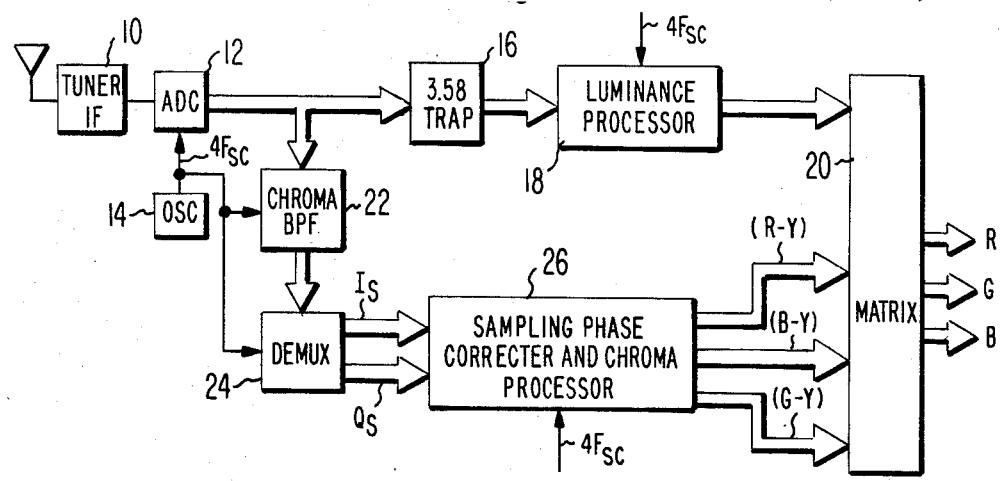
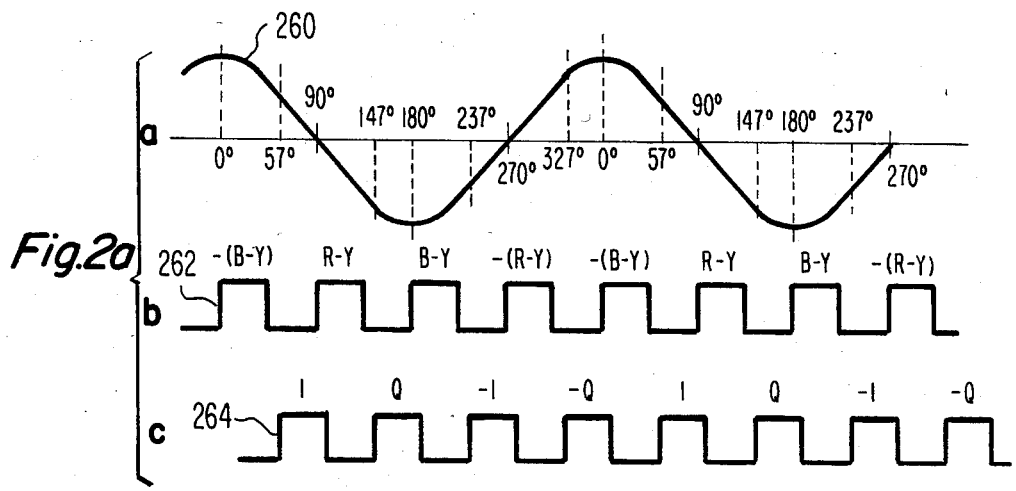
Fig.2a
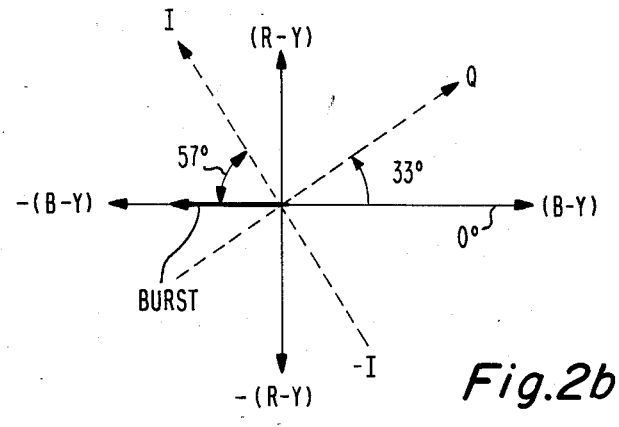
Fig.2b

DIGITAL VIDEO SIGNAL PROCESSING SYSTEM USING ASYNCHRONOUS A-TO-D ENCODING

This invention relates to a digital video processing system, e.g. a digital TV receiver and more particularly to a system for processing digital representations of an analog video color signal where the digital samples were created by an analog-to-digital converter (ADC) operating asynchronously with the color subcarrier.

Recent trends in video signal processing systems have tended toward the use of digital very large scale integrated circuits (VLSI's). For example, TV receivers are being commercially produced which perform the majority of the TV signal processing functions by performing binary computations. In these receivers, broadcast analog video signals are applied to a conventional receiving antenna from which they are processed through an analog tuner and intermediate frequency, IF, circuits. Baseband composite video signal, e.g. NTSC signal, from the IF circuitry is applied to an analog-to-digital converter (ADC) which develops signal samples which are binary representations of the analog composite video signal. The binary samples are processed in binary arithmetic circuits to appropriately condition the luminance and chrominance components of the composite video for application to matrixing circuitry for generating conventional R, G and B color signals to drive the display tube. If the matrixing circuit is digital, then the R, G, B signals developed in the matrix are converted back to analog form before application to the display device. In alternate arrangements the processed luminance and chrominance signals are converted to analog form and applied to an analog matrix for generating the R, G, B signals.

The chrominance component of composite video contains information related to the color of the transmitted image. This component is a phase and amplitude modulated 3.58 MHz, (NTSC) sinusoid. The chrominance component of the broadcast signal is developed by combining two quadrature related color difference or color mixture signals. For purposes of processing the chrominance signal in the receiver it is convenient to demodulate the chrominance component into the quadrature components and process these signals.

Normally the sampling signal which controls the ADC is phase and frequency locked to the color burst signal which is transmitted along with the video signal. Judicious choice of the frequency and phase of the sampling clock or signal greatly facilitates demodulation of the chrominance component to its quadrature components. For example, if the sampling clock rate is at four times the subcarrier rate and in phase with burst, the binary samples of the chrominance component produced by the ADC will be formatted in a sequence $-(B-Y)_n$, $(R-Y)_n$, $(B-Y)_n$, $-(R-Y)_n$, $-(B-Y)_{n+1}$, etc. where the signs attendant the samples are indicative of sampling phase, not sample polarity. To demodulate the sequence into the quadrature components, alternate samples are demultiplexed into two data streams.

One such phase locking system for generating ADC clock signals is described in SMPTE "DIGITAL VIDEO", Vol. 3, pp. 89–98, June 1980, and an example of a digital TV receiver system is described in U.S. Pat. No. 4,270,139, Flamm et al.

Phase locking the sampling clock to burst has the further advantage that hue control may be effectuated simply by adjusting the phase differential between the reference oscillator and burst in the phase locked loop.

Present day systems of the foregoing type do have a shortcoming, however, and that is in the time required to achieve the frequency/phase lock condition. The lock time may be in the range of milliseconds which is prohibitive of certain feature applications. For example, consider a picture in picture feature using a single tuner where a primary channel is displayed on the receiver display tube and a second channel is displayed as an inset on a small portion of the tube. Such a feature requires that the tuner switch between channels in a small portion of a line time and that the sampling clock lock up to the currently selected channel in one color burst period. It will be immediately obvious to those skilled in the art of phase locked loops that such a requirement is a practical impossibility using phase lock techniques.

SUMMARY OF THE INVENTION

The present invention is a digital color video processing apparatus which possesses the benefits of a system where the ADC sampling clock is locked to burst, but which operates with an asynchronous sampling clock. The system includes an ADC which is clocked by a free running crystal oscillator which is set to a frequency substantially equal to four times the color subcarrier frequency. The binary samples produced by the ADC are processed to separate the luminance and chrominance components. The chrominance component is demodulated by demultipexing alternate samples. During the burst interval, phase errors between the free running sampling clock and the axes of the transmitted quadrature component signals are determined and stored for a line interval. During the image information interval of the respective line the demultiplexed chrominance signals are modified in accordance with the stored phase errors to compensate the effects of asynchronous sampling.

BRIEF DESCRIPTION OF THE DRAWINGS

FIG. 1 is a block diagram of a digital television receiver incorporating a system for asynchronous analog-to-digital signal conversion;

FIGS. 2A and 2B are a time versus amplitude waveform diagram showing synchronous sampling clock waveforms in relation to the color burst signal and a phasor diagram of burst relative to the sampling axes;

DETAILED DESCRIPTION OF THE INVENTION

Figure 3:
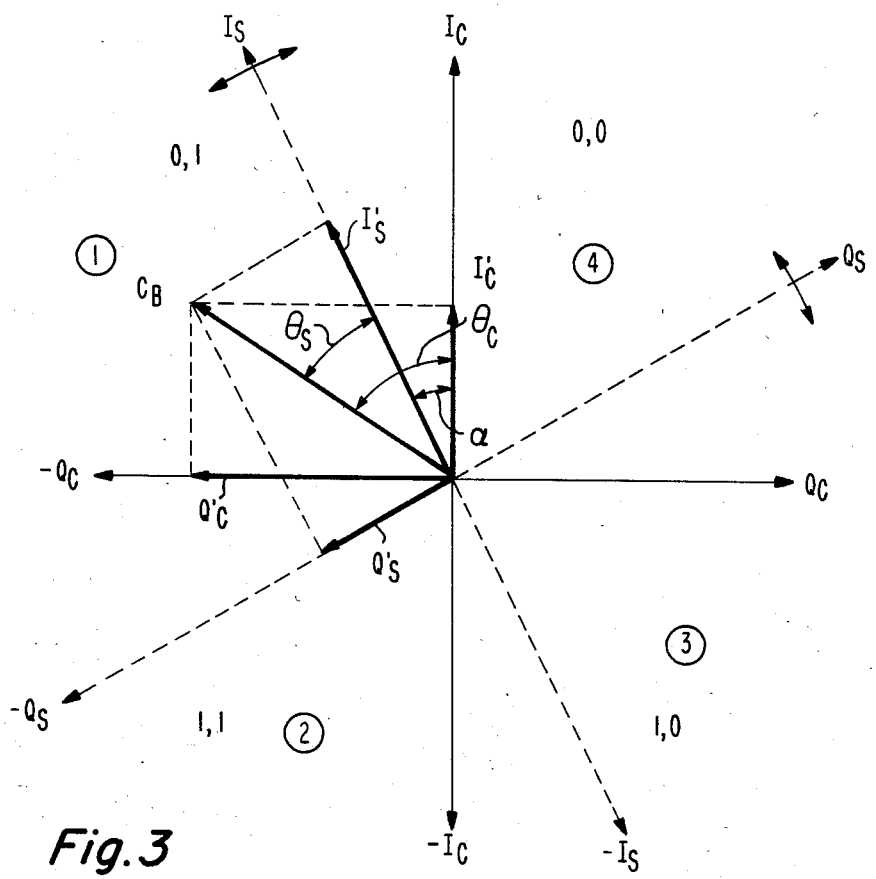
FIG. 3 is a phasor diagram showing the burst vector relative to the axes of synchronous and asynchronous sampling axes.

FIG. 1 is a generalized block diagram of a digital TV receiver embodying the present invention. In the figure, element 10 is conventional analog tuner and IF circuitry which accepts broadcast TV signals and develops baseband composite video signal. The baseband video signal is applied to the analog signal input terminal of an analog-to-digital converter 12. Under the control of a free running crystal oscillator 14, ADC 12 samples the baseband analog composite video signal at substantially four times the color subcarrier frequency (e.g. approximately 14.32 MHz for NTSC signal) and produces binary representations of the analog signal. For purposes of the following discussions it is assumed that ADC 12 provides N-bit samples with each of the N-bits available on parallel output connections. The broad interconnections in the figure are intended to indicate, e.g., N-bit parallel interconnections.

Binary samples from ADC 12 are applied to a filter element 16 which removes the chrominance component of the signal and passes the luminance component to the luminance processor 18 which may contain, e.g., peaking, vertical detail enhancement, gain control, etc., circuitry. Processor 18 appropriately conditions the luminance component for application to the color matrix circuit 20 wherein it is combined with processed chrominance signals to develop R, G and B color signals for driving a display device.

The binary samples from ADC 12 are also applied to filter element 22 which selectively passes the chrominance component of the composite video signal. The chrominance signal is applied to a demultiplexor 24 which demodulates the signal to quadrature components designated Is and Qs. Components Is and Qs are related to the conventional I and Q color mixture signals via the phase difference between the instantaneous sampling points determined by the free running oscillator and the leading and lagging phase angles of 33 and 57 degrees from the positive peak of burst, respectively. Components Is and Qs are related to the conventional (R—Y) and (B—Y) color difference signals via the phase of the instantaneous sampling points relative to the peaks of burst. The Is and Qs samples may be converted to either conventional I and Q color mixture signal samples or conventional (R—Y), (B—Y) color difference signal samples with the use of phase information of the sampling points developed by sampling the burst signal.

The quadrature components Is and Qs are applied to element 26 which determines the phase error between the actual samples Is and Qs and the true I and Q color mixture signal axes during the color burst interval. The phase error calculated from the burst signal is then applied to the image portions of the signal to properly orient the phase of the chrominance signal to produce accurate color rendition of the image represented by the broadcast signal. Element 26 may also include, e.g. circuitry for automatically correcting flesh tones, saturation control circuitry, I, Q-to-(R—Y), (B—Y) matrixing circuitry, etc. Appropriately conditioned chrominance signal, which may be in component form, is applied to matrix element 20 where it is combined with the processed luminance signal.

Note that all of the digital processing elements operate synchronously relative to the binary samples and to each other under the control of clock signals developed from the oscillator 14. The oscillator signal, however, is nonsynchronous with the color subcarrier represented by the color burst interval. The sampling signal, not being frequency locked to the subcarrier, does not substantially affect the quadrature nature of alternate samples as long as the sampling frequency is within a few percent of the subcarrier frequency. It is preferable, however, that the frequency of the sampling signal and the frequency of the subcarrier do not differ by more than an amount to produce a phase differential of greater than 180 degrees over a line interval.

Consider next FIGS. 2A and 2B. FIG. 2A represents the timing relationships between the color burst signal, waveform (a), and two different sampling signals, waveforms (b) and (c). Relative to the respective sampling signals the sampling instant is assumed to be coincident with the positive going transitions of the sampling waveform. Both sampling signals (b) and (c) are presumed to be phase and frequency locked to color burst. For systems designed to process equiband (R—Y) and (B—Y) color difference signals, the sampling signal represented by waveform (b) would be employed. Waveform (b) samples burst in phase with the peaks and zero crossings, i.e. at 0, 90, 180 and 270 degrees, where zero degrees is defined at the positive peak of the burst waveform. For systems designed to process wideband I and narrowband Q color mixture signals, waveform (c) is the appropriate sampling signal. Waveform (c) is similar to waveform (b) but delayed therefrom by 57 degrees relative to the phase angle of burst.

FIG. 2B is a phasor representation of the FIG. 2A waveform. Note in FIG. 2B alternate sampling instances define the quadrature axes of the phasor diagram. Burst is shown aligned with the —(B—Y) axis and the (R—Y) axis is displaced from burst by 90 degrees. The conventional I and Q color mixture signal axes are shown displaced from burst by 57 and 147 degrees, respectively.

Next consider FIG. 3. FIG. 3 is a phasor diagram showing the burst phasor $C_B$ displaced from the phase/frequency locked sampling axis Ic by the angle $\theta c$. The phase/frequency locked sampling axis Qc is displaced 90 degrees from the Ic axis indicating their quadrature relationship. The axes Is and Qs shown in broken lines are intended to illustrate sampling axes which are not phase/frequency locked to the color burst. The Is and Qs axes are slowly rotating, the rate and direction of rotation being a function of the frequency difference between burst (subcarrier) and the Is, Qs sampling clock, and whether the burst frequency is greater or lesser than exactly one-fourth of the sampling rate. For example, if the 14.32 MHz sampling clock is stable to one part of $10^5$ and the color burst drifts at $\pm 150$ Hz per line time, the Is/Qs axes will rotate relative to the Ic, Qc axes at the rate of 4.25 degrees per line time (63 $\mu$sec).

The angle $\theta c$ formed between the burst phasor $C_B$ and the correct axis Ic is by convention well defined at 57 degrees. The phase error between the sampling clock (i.e. the Is axis) and the phase locked sampling axis Ic is illustrated by the angle $\alpha$ which is slowly varying.

The magnitude of the Is sample is equal to the length of the vector Is'. The magnitude of the Qs sample is Qs'. During the burst interval, if the I and Q samples are made at the true I and Q color mixture signal axes Ic and Qc, the I and Q magnitudes should be equal to Ic' and Qc' for the burst phasor shown. From FIG. 3 it can be shown that:

$$Is' = C_B \cos \theta s \qquad (1)$$

$$Qs' = C_B \sin \theta s \qquad (2)$$

and $$Ic' = C_B \cos \theta c \quad (3)$$

$$Qc' = C_B \sin \theta c \quad (4),$$

but $\theta c = \theta s + \alpha$ and $\theta c$ has been established by convention to be 57 degrees. Therefore, the angle $\alpha$ is 57-$\theta s$ degrees. Substituting $\theta s + \alpha$ for $\theta c$ in equations (3) and (4)

$$Ic' = C_B \cos(\theta s + \alpha) \quad (5)$$

$$Qc' = C_B \sin(\theta s + \alpha) \quad (6).$$

Thus, if the magnitude $C_B$ is calculated from the sampled values Is' and Qs' and the angles $\theta s$ and $\alpha$ are calculated using the values of Is' and Qs', then the desired I and Q values Ic' and Qc' can be calculated from equations (5) and (6). The magnitude $C_B$ may be determined by, e.g. calculating the square root of the sum of the squares of Is' and Qs'. The angles $\theta s$ may be determined by calculating the arctangent of Qs' divided by Is' and the angle $\alpha$ may be determined by subtracting the angle $\theta s$ from 57 degrees.

Figure 4:
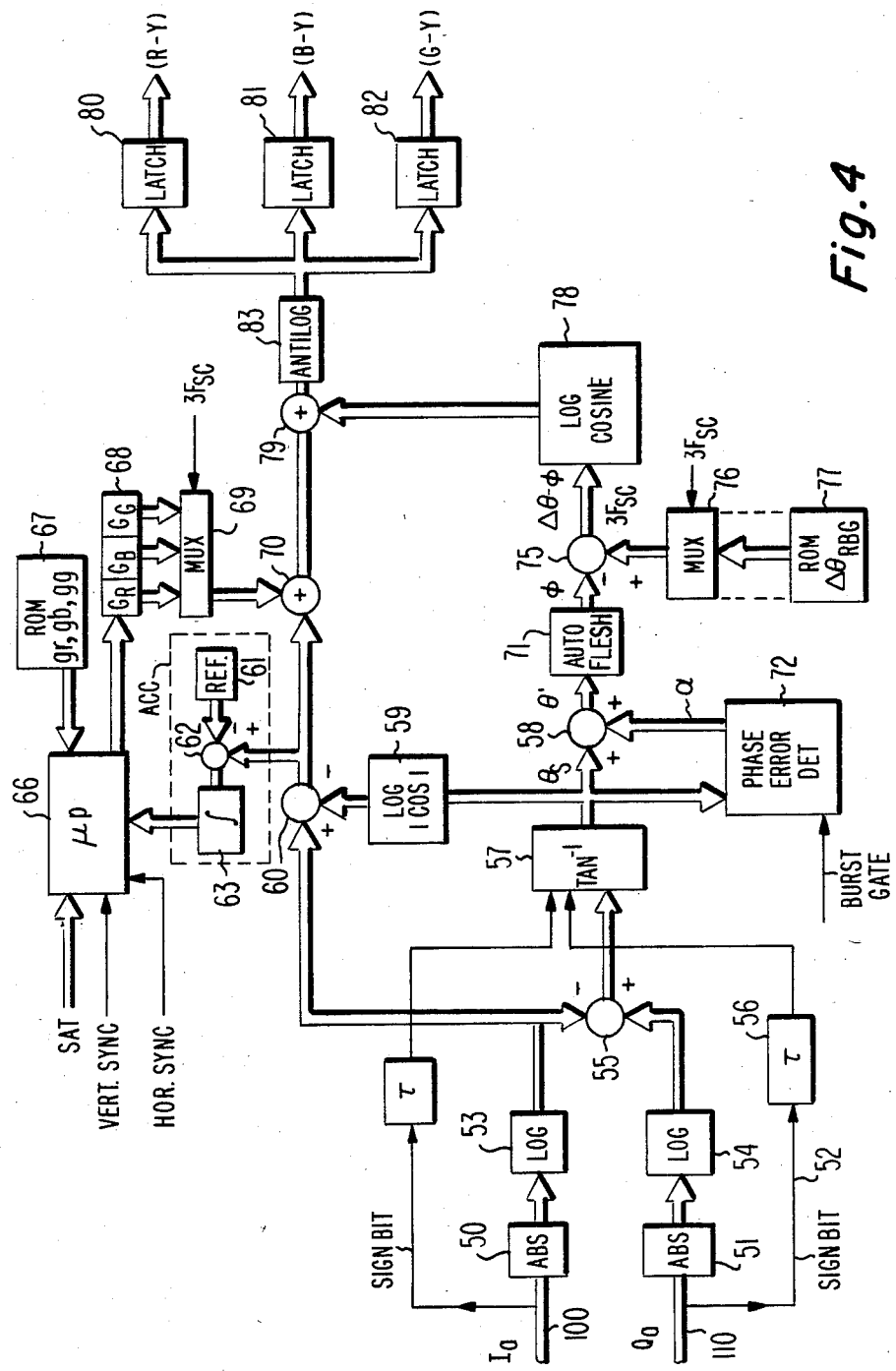
FIG. 4 is a block diagram of digital color signal processing circuitry including circuitry for compensating for asynchronous sampling phase errors.

FIG. 4 is an illustrative example of the circuitry 26 of FIG. 3 realized using conventional circuit elements. In FIG. 4, the signals being processed are assumed to be in digital format such as pulse code modulated, PCM, binary format (either two's complemented signals or binary signals plus a sign bit) depending on the signal sample rate and the processing speed of the devices, compensating delays may be required in certain of the signal paths, but one skilled in the art of circuit design would know where such delays would be necessary in his particular system.

The bandwidth of the information contained in the chrominance signal is less than 1.5 MHz. The I and Q samples respectively occur at twice the subcarrier rate, e.g. 7.16 MHz for an NTSC signal. The Nyquist sampling criterion may therefore be satisfied if alternate I and alternate Q samples are processed. The demultiplexor 24 will be assumed to provide to circuit 26 only the +Is and +Qs samples from the recurring chrominance sequences +Is, +Qs, −Is, −Qs, +Is ... etc.

In FIG. 4 the Is and Qs PCM signals are applied to terminals 100 and 110. These signals are respectively applied to absolute value circuits 50 and 51 which pass the magnitudes of the Is and Qs signals. The magnitudes of Is and Qs are applied as address codes to ROM's 53 and 54 which are programmed to produce the logarithms of the address codes applied to their respective address input ports. The signal corresponding to the log |Is| is subtracted from the signal corresponding to the log |Qs| in subtractor 55 which produces output signal codes corresponding to log (|Qs|/|Is|). These signal codes are applied along with the sign bits of signals Is and Qs as input address codes to ROM 57 (the Is and Qs sign bits being the most significant bit of the composite address code). ROM 57 is programmed to produce output codes corresponding to the arctangent (Qs/Is), i.e., angles $\theta s$. Since the codes produced by subtractor 55 were generated from the magnitudes |Is| and |Qs|, they only represent the range of angles from zero to 90 degrees where zero degrees is defined along the +Is axis. The Is and Qs sign bits added to the address codes applied to ROM 57, provide the information needed to expand the angle information from zero to 360 degrees or from zero to ±180 degrees.

Assume that the N least significant bits of the ROM 57 address input are coupled to subtractor circuit 55, the N+$1^{st}$ bit is coupled to the Qs sign bit and the N+$2^{nd}$ bit is coupled to the Is sign bit. Assume also that the sign bits are 0's for positive Is or Qs values and 1's for negative Is or Qs values respectively. ROM 57 is programmed to output the arctangent of the antilog of the N least significant bits of the applied address code for the N+$1^{st}$ and N+$2^{nd}$ address bits equal to 01 respectively, i.e. for the burst vector in quadrant 1 defined by the Is and Qs axes as shown in FIG. 3. For the N+$1^{st}$ and N+$2^{nd}$ address bits being respectively 00, 10 and 11, corresponding to the three quadrants 4, 3 and 2 defined by the $I_s$ and $Q_s$ axes in FIG. 3 and occurring clockwise starting from the upper righthand quadrant, ROM 57 is programmed to output signals corresponding to 360 degrees minus; 180 degrees plus; and 180 degrees minus the arctangent of the antilog of the N least significant bits of the address code. In this manner ROM 57 produces angles over the range of 0–360 degrees where 0 degrees is defined along the +I axis and positive angles occur counter clockwise from +Is. The angle codes produced by ROM 57 are applied to adder 58.

The angle codes produced by ROM 57 are also applied to the phase error detector 72. The phase error detector, which will be described with reference to FIG. 5, under control of a burst gate signal, examines the angle codes representing the chrominance phase angle during the burst interval. Circuit 72 calculates the difference, $\alpha$, between the phase angles represented by the Is and Qs samples and the phase angles that would be produced were the samples taken in phase with the desired or correct axes Ic and Qc. The angle $\alpha$ is stored until the next burst interval and is also applied to adder circuit 58 during the period between burst intervals. Adder circuit 58 sums the angles $\theta s$ and $\alpha$ to produce corrected angles $\theta'$ equal to $\theta c$.

PCM codes corresponding to angle $\theta'$ from ADDER 58 are applied to circuit 71 which produce flesh corrected PCM codes corresponding to angles $\phi$. Circuit 71 may be a ROM nonlinearly programmed to produce flesh corrected angles $\phi$ for angles $\theta'$ representing chrominance angles normally associated with flesh colors applied as address codes. For angles $\theta'$ which do not represent chrominance angles in the range of flesh colors the angles $\phi$ produced by circuit 71 equal the angles $\theta'$. For example, ROM 71 may be programmed to generate angles $\phi$ equal to ($\theta'$-K sin 2$\theta'$) for angles $\theta'$ equal to ±90 degrees and angles $\phi$ equal to angles $\theta'$ for angles $\theta$ from ±90 degrees to ±180 degrees. (Note that for ROM 71 programmed with the above function circuit 57 must be programmed to produce angles $\theta s$ from 0 to ±180 degrees rather than angles from 0 to 360 degrees.)

Angles $\phi$ from circuit 71 may be applied as address codes directly to ROM 78 programmed to produce the sines and cosines of angles $\phi$. The sines and cosines may then be multiplied by the magnitudes $C_B$ to produce flesh tone corrected quadrature signals Ic and Qc. However, the illustrative circuitry of FIG. 4 is arranged to generate flesh corrected (R−Y), (B−Y) and (G−Y) color difference signals. The relationship of the (R−Y) and (B−Y) color difference signals to the Ic and Qc axis is illustrated in FIG. 2 if the I and Q axes are presumed to correspond to the Ic and Qc axes.

The composite video signal, $E_M$, of an NTSC system may be mathematically described by the equation:

$$E_M = E_Y + (E_Q \sin(\delta t + 33°) + E_I \cos(\delta t + 33°)) \quad (7)$$

where $E_Y$, $E_Q$ and $E_I$ are the instantaneous voltages of the luminance Y and the Q and I signal components. The term in the outer parenthesis represents the chrominance components of the signal. If the same signal is represented in terms of the (R—Y) and (B—Y) color mixture signals the composite signal is represented by the equation:

$$E_M = E_Y + (0.493(E_B - E_Y)\sin \delta t + 0.887(E_R - E_Y)\cos \delta t) \tag{8}$$

where $E_B$ and $E_R$ are the instantaneous voltages of the Blue and Red color signals. The term in the outer parenthesis again represents the chrominance component of the composite signal. The I and Q values in equation (7) are equated to the (R—Y) and (B—Y) terms in equation (8) via the corresponding sine terms and the corresponding cosine terms. The correspondence may be made by considering that the instantaneous I and Q values are the projections of the chrominance phase $C_B$ on the I and Q axes. Similarly the instantaneous (R—Y) and (B—Y) values are the projections of the chrominance phase $C_B$ on the (R—Y) and (B—Y) axes. The I axes is 33 degrees from the (R—Y) axis and 57 degrees from the —(B—Y) axis. Knowing the corrected angle $\phi$ of the chrominance phase from the I, i.e. the Ic axis, the (R—Y) and (B—Y) values may be determined from the equations:

$$(R-Y)' = C_B \cos(33° - \phi) \tag{9}$$

$$(B-Y)' = C_B \cos(57° + \phi) \tag{10}$$

In a similar manner the (G—Y) value is determined from the relationship $$(G-Y)' = C_B \cos(66° - \phi) \tag{11}$$

The angles 33°, 57° and 66° will be referred to as matrixing angles $\Delta\theta_R$, $\Delta\theta_B$ and $\Delta\theta_G$.

If equations (7) and (8) are examined and corresponding sine and cosine terms are respectively equated, it is seen that the transmitted (R—Y) and (B—Y) signals are attenuated. To account for these attenuation factors the righthand sides of equations (9), (10) and (11) may be multiplied by compensating factors $g_R$, $g_B$ and $g_G$, respectively.

Referring again to FIG. 4, PCM codes $\phi$ from element 71 are applied to subtractor 75 to which signal codes corresponding to the (R—Y), (B—Y) and (G—Y) matrixing angles $\Delta\theta R$, $\Delta\theta B$ and $\Delta\theta G$ are applied. The $\phi$ codes are applied to subtractor circuit 75 at an $f_{sc}$ sample rate. The three matrixing angle codes from storage element 77 (e.g., a ROM) are each multiplexed into the subtractor circuit 75 for each $\phi$ codeword, sequentially generating the three difference angles ($\Delta\theta$R-$\phi$), ($\Delta\theta$B-$\phi$) and ($\Delta\theta$G-$\phi$). This may be performed by clocking the ROM, at a $3f_{sc}$ rate. The difference angles ($\Delta\theta$i-$\phi$) are applied to element 78 which may be a ROM programmed to generate the logarithms of the cosines of the angles applied as address codes thereto, which logarithms are applied to ADDER circuit 79. The log cosines ($\Delta\theta$i-$\phi$) are summed therein with the log (Gi$C_B$), the chrominance magnitude modified by the gain coefficients, to produce signal codewords corresponding to log (Gi$C_B$ cos($\Delta\theta$i-$\phi$)). These signal codewords are applied to antilog circuit 83 which generates the sequence of signals (R—Y), (B—Y) and (G—Y) that are demultiplexed into latches 80, 81 and 82.

The magnitude, $C_B$, of the vector sum of I and Q in the FIG. 4 embodiment is generated according to the equation:

$$C_B = |Is|/|\cos \theta s| \tag{12}$$

To this end the angles $\theta$s from element 57 are applied as address codes to a ROM 59 which is programmed to produce the log $|\cos \theta s|$ of the angle $\theta$s signal codes applied to its address input. The log $|\cos \theta s|$ codewords from ROM 59 are applied to one input port of a subtractor circuit 60 wherein they are subtracted from the log $|Is|$ codewords from ROM 53 to produce a signal corresponding to log $|Is|/|\cos \theta s|$. This signal is applied to ADDER 70 and the ACC circuit including reference 61, comparator 62 and integrator 63. The ACC circuit generates a control signal which is proportional to the average difference between the magnitude of the chrominance signal and a predetermined value. The control signal is applied to an input port of the microprocessor 66 along with horizontal and vertical synchronizing signals and a chrominance saturation control signal. A ROM 67 supplies the coefficients gR, gB and gG to the microprocessor 66 which periodically calculates the products $Gi = Acc \cdot Sat \cdot gi$ equal to the products of the Acc control signal, the saturation control signal and the respective projection coefficient.

It is noted that the coefficients gi may also include a term to compensate for the different color phosphor efficiencies of the particular image display tube employed in the receiver. The microprocessor generates the logarithms of the composite gain factors Gi and outputs them to a buffer 68. From buffer 68 the log (Gi) gain factors are multiplexed at a $3f_{sc}$ rate into ADDER 70 where they are added to the log $|Is|/|\cos \theta s|$ signal to produce signal samples corresponding to log (Gi$C_B$). These samples or codewords are applied to adder 79 where they are combined with the log (cos($\Delta\theta$i-$\phi$)) signals.

The signal generator for developing the timing signals to the FIG. 4 circuitry is not shown because it is not considered part of this invention. These signals may be developed by conventional techniques which are known by those skilled in the art.

Figure 5:
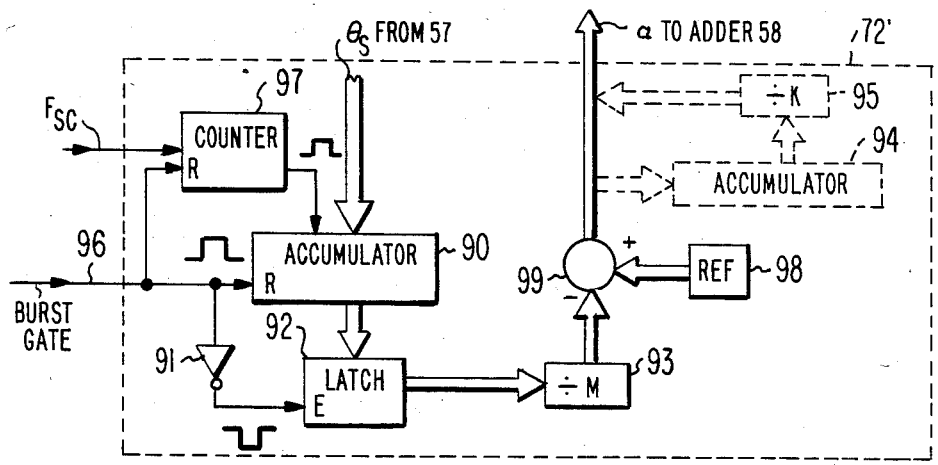
FIG. 5 is a block diagram of circuitry for detecting chrominance signal phase errors resulting from asynchronous sampling by the ADC.

Referring now to FIG. 5, there is shown exemplary circuitry for developing the phase angle error signals $\alpha$. In FIG. 5, angle values $\theta$s are applied to an accumulator 90 under the control of a burst gate signal applied to connection 96, and a timing signal from counter 97. The burst gate signal may be produced by known conventional techniques. Counter 97 is reset by the leading transition of the burst gate pulse available on connection 96. Counter 97 responsive to the reset pulse produces an enabling output potential which is applied to accumulator 90. A clock signal $f_{sc}$ synchronous with the occurrence of angle values $\theta$s is applied to the clock input of the counter. The counter effectively counts a prescribed number, e.g. M, of the $f_{sc}$ clock signals. After the prescribed number of clock pulses have occurred, the output potential of the counter changes to a potential value which disables accumulator 90. The enabling signal from counter 97 is of such duration to permit M consecutive angle values from circuit 57 to be input to the accumulator 90 during the burst interval. The M angle values will nominally be selected from the center of the burst sequence of reference cycles. Accumulator 90 sums the applied burst phasor angle values. The accumulator may consist of an adder and a latch (not shown). The respective inputs of the adder are coupled to the output of the latch and the input of the accumulator. The output of the adder is coupled to the output of the accumulator and the input of the latch. In operation, each successive sum from the adder is input to the latch from which it is available to be added to the next input value.

The output sum from the accumulator is applied to the latch 92. Latch 92 is loaded with the sum in the accumulator at the end of the burst interval by the complement of the burst gate. More paraticularly, the burst gate signal is applied to the inverter 91 which inverts the signal. The falling or trailing edge of the burst gate pulse is converted to a rising potential transition at the output terminal of inverter 91. Latch 92, responsive to the rising transition of the inverted burst gate pulse, stores the value currently applied to its input port. This value is stored for one line period until the termination of the next subsequent burst gate pulse.

The output of the latch is applied to the divider circuit 93 which divides the applied value by M to produce an average value of the angle $\theta$s. It will be appreciated by those skilled in the art of digital signal processing that divider circuit 93 may be positioned to precede latch 92. Further, if the value M is an integral power of two the divider 93 may be eliminated and division may be accomplished by shifting the bits of the PCM codeword rightward to lesser significant bit positions.

The output value from divider circuit 93 is applied as subtrahend to subtractor circuit 99 and a reference angle value, e.g. 57 degrees, from source 98 is applied as minuend to subtractor circuit 99. Subtractor 99 produces a difference value corresponding to the angle $\alpha$ and which is equal to the reference angle minus the average value $\theta$s determined over the burst interval.

In some circumstances it may not be desirable to use the value of $\alpha$ determined on the line-to-line basis. The value $\alpha$ may be more appropriately determined from an average of values $\alpha$ determined from a number of lines. Circuits 94 and 95 shown in phantom lines may be implemented to perform such averaging.

Where it is desired to generate averaged values for $\alpha$ the differences produced by subtractor 99 are applied as input values to the accumulator 94. Accumulator 94 sums the K lastmost values of the differences applied, K being a predetermined integer. The running sum of K values of the differences from accumulator 94 is applied to the divider circuit 95 which divides the sum by the value K to generate the average value of $\alpha$ over K lines. This average value of $\alpha$ is then applied to the adder 58 in FIG. 4. Note that the averaging circuitry 94 and 95 may be interposed between latch 92 and divider 93 or between divider 93 and subtractor 99 if desired.

If the correction angle $\alpha$ changes significantly from line-to-line, the value $\alpha$ applied to adder 58 will be substantially in error towards the end of respective line intervals. System performance can be enhanced by incrementing/decrementing the value $\alpha$ proportional to the change of the value $\alpha$ between preceding lines. For example, if the lastmost angle $\alpha$ increased by four degrees over the preceding $\alpha$ value, it may be anticipated that the nextmost value of $\alpha$ will also be increased by four degrees over the present value. System performance may be enhanced if the value of $\alpha$ is successively increased by one degree at quarter line intervals so that, at most, the anticipated error in $\alpha$ will only be one degree. More or less, corrections to $\alpha$ can be made over the line interval as desired.

Figure 6:
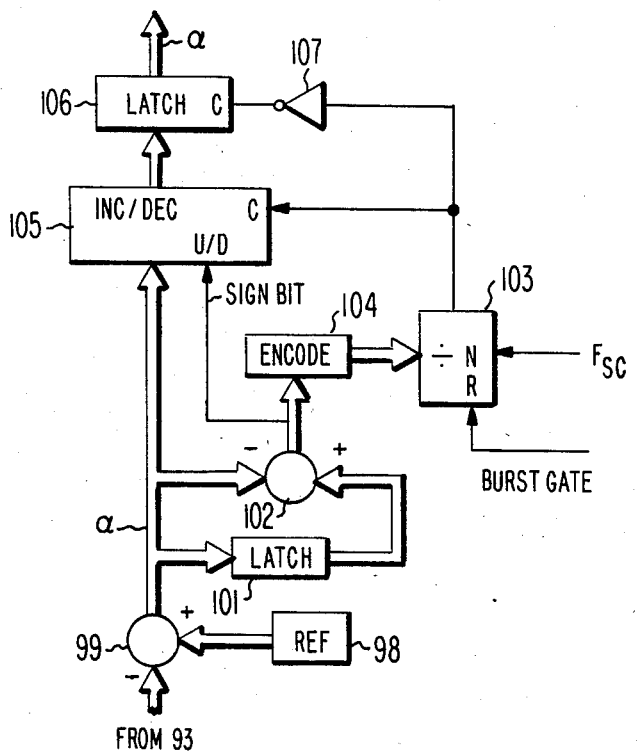
FIG. 6 is a block diagram of circuitry which may be added to the FIG. 5 circuit for incrementing or decrementing the correcting factor, $\alpha$, at selected times during a line interval.

FIG. 6 illustrates exemplary circuitry for altering the angle $\alpha$ during a line interval. Values of $\alpha$ from subtractor 99 are subtracted in circuit 102 from the previous value of $\alpha$ stored in latch 101 to generate the value $\Delta\alpha$. The magnitude of $\Delta\alpha$ is applied to an encoder 104 which generates a divisor value, N, for setting the programmable pulse counter 103. Counter 103 is clocked with the signal $f_{sc}$ having a frequency equal to the chrominance subcarrier frequency. Responsive to the divisor N from encoder 104, divider 103 produces an output pulse for every N pulses of the $f_{sc}$ clock signal. For example, assume the clock frequency $f_{sc}$ is 3.58 MHz. For convenience assume also that the image portion of a line interval is approximately 50 $\mu$sec. so that there are 180 clock pulses in the image interval of the line. Finally assume that $\alpha$ is to be incremented only if $\Delta\alpha$ is greater than 1 degree. Encoder 104 may be designed to generate a divisor N equal to 180 divided by $\Delta\alpha$. Thus, if the magnitude of $\Delta\alpha$ equals 1, 2, 3, ..., the divisor will be 180, 90 and 60, ... respectively. Responsive to these divisors, divider circuit 103 will generate pulses at the end of the line, at the middle and end of the line, and at ⅓ of the line intervals, respectively.

The value of $\alpha$ from subtractor 99 is applied to the increment/decrement circuit 105, having an up/down control input terminal U/D and a clock input terminal C. The sign bit of the $\Delta\alpha$ signal is coupled to the U/D terminal and determines whether the input value $\alpha$ is to be incremented or decremented by a value of one for each clock pulse applied to the C input. The output pulses from programmable divider 103 are coupled to the clock input terminal of circuit 105 and determine the points in time when $\alpha$ is incremented/decremented. Note the value $\alpha$ applied to the circuit is initially passed to its output port, and thereafter if clock pulses occur at terminal C, the output value from circuit 105 are incremented or decremented accordingly. It may be desirable to interpose a latch 106 between the output port of circuit 105 and adder 58 to ensure that the values applied to adder 58 are uncertain for the minimum time period, i.e. during the increment/decrement process.

For some applications it may be desirable to generate average values of the signal $\Delta\alpha$ for application to decoder 104. This averaging may be performed by interposing elements similar to elements 94 and 95 of FIG. 5 between subtractor 102 and encoder 104.

The circuits in FIGS. 5 and 6 are for illustrative purposes. One skilled in the art of digital processing will readily be able to construct variations thereof. By way of example, all of the functions described with respect to FIGS. 5 and 6 may be performed by a microprocessor appropriately programmed.

Returning to FIG. 1, luminance and chrominance components of composite video signal are extracted via trap 16 and bandpass filter 22. However, superior system performance in current video systems is achieved by separating chrominance and luminance signals with the use of comb filters. Conceptually, comb filters require that signals be delayed by precisely one line period to guarantee a 180 degree chrominance phase differential between current and delayed signal (for a 1H comb filter). In a system which samples video signal asynchronously with respect to the subcarrier, the 180 degree phase differential may not be achieved resulting in incompletely combed signals. Comb filtering of an asynchronously sampled signal may be accomplished with a 2H comb, however.

Figure 7:
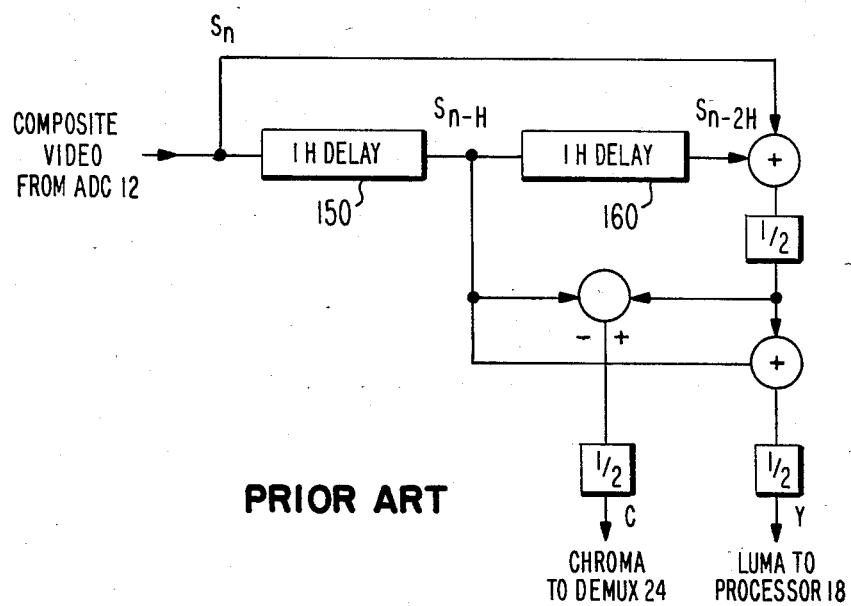
FIG. 7 is a block diagram of a prior art 2-H comb filter.

FIG. 7 is a circuit diagram of a 2H comb which is well documented in the literature and which may be substituted for the trap 16 and bandpass filter 22 in FIG. 4. In the 2H comb filter circuit, current samples, $S_n$, are averaged with samples $S_{n-2H}$ which are delayed by two line intervals. The averaged samples are then added to and subtracted from samples $S_{n-H}$ which are delayed by one line interval to produce the luminance, Y, and chrominance, C, components, respectively. Consider that the sampling and subcarrier frequencies differ by an amount such that over a line interval their relative phase relationship changes by $\Delta p$ degrees. Relative to the 1H delayed samples $S_{n-H}$, the chrominance phase of the current samples, $S_n$, will differ from 180 degrees by $\pm \Delta p$ degrees. Similarly the phase of samples $S_{n-2H}$ delayed by two line intervals will differ from the phase of samples $S_{n-H}$ by $180 \mp \Delta P$ degrees. When the $S_n$ and $S_{n-2H}$ samples are averaged, the chrominance phase of the averaged samples will tend to be precisely 180 degrees out of phase with the chrominance phase of the 1H delayed samples $S_{n-H}$. Thus, the averaged samples may be additively and subtractively combined with the 1H delayed $S_{n-H}$ samples to produce comb filtered luminance and chrominance signal components substantially free of cross components.

In the foregoing description of the invention the chrominance samples are corrected to correspond to a fixed phase relationship with the burst signal by generating the angle and magnitude of the sampled chrominance phasor and manipulating the angle values. However, the chrominance samples may also be corrected by forming the sums of products of respective quadrature chrominance components occurring during the burst interval and samples occurring during the image interval. The illustrative example should be construed to be a preferrred embodiment and not the only method contemplated by the scope of the claims.

What is claimed is:

1. Apparatus for digitally processing a composite video signal including a luminance component, and a chrominance component in the form of an amplitude and phase modulated subcarrier, and including a color reference burst interval, comprising:
   a source of analog composite video signal;
   a free running oscillator for generating clocking signals;
   an analog-to-digital converter coupled to said source for generating digital representations of the analog signals at instants determined by said clocking signals.

2. Apparatus for digitally processing a composite video signal including a luminance component and a chrominance component in the form of an amplitude and phase modulated subcarrier, and including a color reference burst interval, comprising:
   a source of analog composite video signal;
   a free running oscillator for generating clocking signals;
   an analog-to-digital converter coupled to said source for generating digital representations of the analog signals at instants determined by said clocking signals;
   means responsive to said digital representations for separating the digital luminance and chrominance components;
   means responsive to the digitized chrominance component for calculating angles $\theta s$ corresponding to the phase of the chrominance signal relative to selected sampling instants;
   means responsive to the angles $\theta s$ occurring during the color burst reference for calculating phase error between the sampling instants and predetermined phases of the color burst reference; and
   means for combining the phase error calculated during burst and calculated angles $\theta s$ of the chrominance signal to produce chrominance angles $\theta c$ related to predetermined phases of said color burst reference, said angles $\theta c$ being applied to further chrominance signal processing circuitry.

3. The apparatus set forth in claim 2 wherein the means for separating the chrominance and luminance components is a 2H comb filter.

4. The apparatus set forth in claim 2 wherein the means for calculating phase errors during burst includes:
   means for averaging a predetermined number of angles $\theta s$ produced during the burst period to generate an averaged angle value $\theta s'$;
   a source of a constant angular reference value;
   means responsive to said constant angular reference value and the averaged angle value $\theta s'$ for determining the difference, $\alpha$, therebetween, the values $\alpha$ corresponding to said phase error; and
   means for storing said difference $\alpha$.

5. The apparatus set forth in claim 4 further including;
   means for generating an averaged difference value $\alpha'$ from a predetermined number of successively determined difference values $\alpha$.

6. The apparatus set forth in claim 4 wherein the means for combining said phase error and said calculated angles $\theta s$ includes;
   means for determining a difference value, $\Delta\alpha$, corresponding to the difference between successive calculated values of $\alpha$;
   means for incrementing or decrementing the current value of the phase error $\alpha$, at selected times between burst intervals, the size of the increment or decrement values being related to the current value of $\Delta\alpha$.

7. The apparatus set forth in claim 5 wherein the means for combining said phase error and said calculated angles $\theta s$ includes;
   means for determining a difference value, $\Delta\alpha$, corresponding to the difference between successive calculated averaged values $\alpha'$;
   means for incrementing or decrementing the current value of the phase error $\alpha'$, at selected times between burst intervals, the size of the increment or decrement values being related to the current value of $\Delta\alpha$.

8. Apparatus for digitally processing a composite video signal including a luminance component and a chrominance component in the form of an amplitude and phase modulated subcarrier, and including a color reference burst interval, comprising:
   a source of analog composite video signal;
   a free running oscillator for generating clocking signals;
   an analog-to-digital converter coupled to said source for generating digital representations of the analog signals at instants determined by said clocking signals;

means responsive to said digital representations for separating the digital luminance and chrominance components;

means responsive to the digitized chrominance component for calculating angles $\theta s$ corresponding to the phase of the chrominance signal relative to selected sampling instants;

means responsive to the angles $\theta s$ occurring during the color burst reference for calculating phase error between the sampling instants and predetermined phases of the color burst reference;

means for combining the phase error calculated during burst and calculated angles $\theta s$ of the chrominance signal to produce chrominance angles $\theta c$ related to predetermined phases of said color burst reference, said angles $\theta c$ being applied to further chrominance signal processing circuitry;

means coupled to the means for combining the phase error and calculated angles $\theta s$ to produce angles $\theta c$ for producing values corresponding to the cosines of arguments including the angles $\theta c$;

means responsive to successive samples of the digitized chrominance component for calculating values corresponding to the magnitude of the chrominance signal;

means responsive to the values corresponding to the magnitude of the chrominance signal and the values corresponding to said cosines for producing the products thereof; and means for demultiplexing said products to produce quadrature components of the chrominance signal.

9. Apparatus for digitally processing a composite video signal including a luminance component and a chrominance component in the form of an amplitude and phase modulated subcarrier, and including a color reference burst interval, comprising:

a source of analog composite video signal;

a free running oscillator for generating clocking signals;

an analog-to-digital converter coupled to said source for generating digital representations of the analog signals at instants determined by said clocking signals;

means responsive to the digital representations for separating the luminance and chrominance components of the composite video signal;

means responsive to the digitized samples of the chrominance component occurring during said color reference burst interval for generating correction factors related to the difference between the phase of the burst signal at the sampling instants and predetermined phases of the burst signal; and means for combining samples corresponding to the digitized values of the chrominance signal with said correction factors to produce chrominance samples having a predetermined phase relationship with the color burst reference signal.

10. Apparatus for processing a composite analog color video signal including an analog-to-digital converter for generating digital representations of said analog signal asynchronously relative to the color burst reference and including open loop circuitry for generating digital representations of the chrominance component having values which comport with digital representations of chrominance signal having a fixed phase relation to the color burst reference.

* * * * *